R. Porter, Rotary Blower.
Nº 45,749.   Patented Jan. 3, 1865.
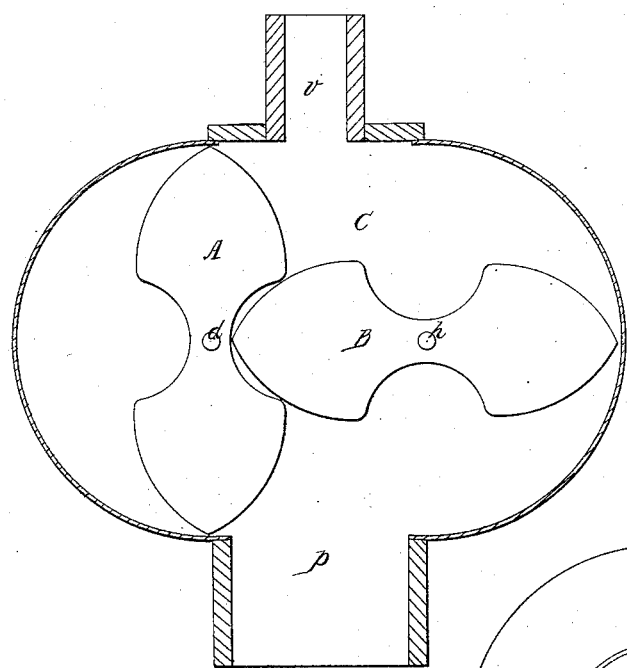
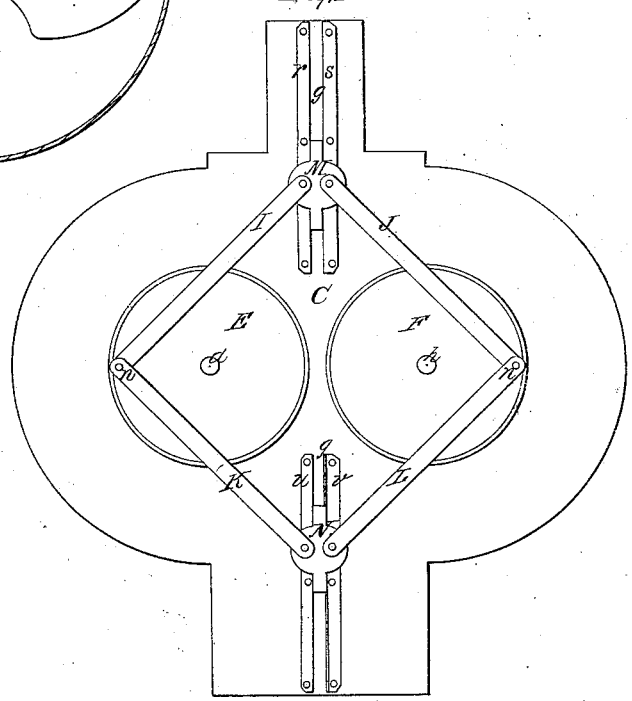
Witnesses:
Inventor:
Rufus Porter

UNITED STATES PATENT OFFICE.

RUFUS PORTER, OF MALDEN, MASSACHUSETTS.

IMPROVEMENT IN FAN-BLOWERS.

Specification forming part of Letters Patent No. 45,749, dated January 3, 1865; antedated June 23, 1864.

*To all whom it may concern:*

Be it known that I, RUFUS PORTER, of Malden, in the county of Middlesex and State of Massachusetts, have invented a new and useful Improvement in Blowers; and I hereby declare that the following is a full and exact description of the same, reference being had to the annexed drawings, making part of this specification, in which—

Figure 1 is a horizontal section or vertical view of the interior, and Fig. 2 is a vertical view of the machine with the regulator connected.

The nature of this invention consists in arranging two cams of peculiar form to revolve in contrary directions within a box of a suitable form, and so regulated in their motion by means of a combination of pitmen outside that when in motion a portion of the peripheries of the two cams shall be constantly contiguous or nearly in contact, while the two ends or wings of each move in proximity to the curved sides of the box.

Two revolving cams, A and B, of the form represented in the drawings, Fig. 1, are mounted upon central axles within a box, C, in opposite sides of which are flumes $o$ and $p$, the one for the induction and the other for the escape of air. The two cams are placed in positions transverse or at right angles with each other, and the two axle-shafts $d\ h$, extend upward through the top of the box, and are surmounted by two band-wheels, E and F. To the upper side of each band-wheel, near the periphery thereof, is attached a pivot, $n$, and to each pivot are connected two pitmen, I J K L, extending forward and backward from their respective pivots, and the opposite ends of each pair of pitmen are connected to the wings of a sliding shaft, M N, which vibrates horizontally in a central groove, $g\ g$, or between two guide-plates, $r\ s\ u\ v$. These four pitmen, with the sliding shafts and guide-plates thus arranged and connected, constitute a regulator, whereby the relative motions and positions of the cams are governed. Driving-belts may be applied to both band-wheels, moving them in opposite directions, or only to one band-wheel—the effect will be the same. By this arrangement the use of gear-wheels (which have been proved to be objectionable for this purpose) is dispensed with.

What I claim as my invention, and desire to secure by Letters Patent, is—

The regulator I J K L M N, in combination with the cams A B in box C, all combined for the purpose herein specified.

RUFUS PORTER.

Witnesses:
 A. CHANDLER,
 W. L. WHEELER.